Figure 1:
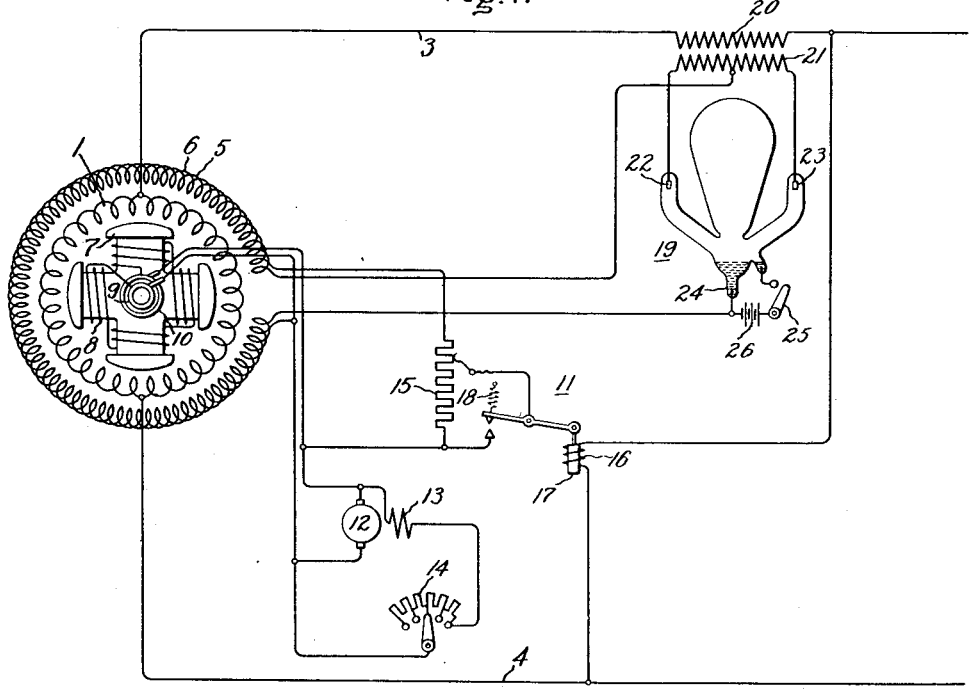

Nov. 19, 1929.    C. A. NICKLE    1,736,618

REGULATION OF DYNAMO ELECTRIC MACHINES

Original Filed Nov. 10, 1925

Inventor:
Clifford A. Nickle,
by *Alexander S. [signature]*
His Attorney.

Patented Nov. 19, 1929

1,736,618

UNITED STATES PATENT OFFICE

CLIFFORD A. NICKLE, OF SCHENECTADY, NEW YORK, ASSIGNOR TO GENERAL ELECTRIC COMPANY, A CORPORATION OF NEW YORK

REGULATION OF DYNAMO-ELECTRIC MACHINES

Application filed November 10, 1925, Serial No. 68,192. Renewed April 10, 1929.

My invention relates to the regulation of dynamo-electric machines, in particular to the voltage regulation of synchronous alternating-current machines, and has for its principal object the provision of improved regulating means whereby the voltage of an alternating-current machine may be maintained substantially constant irrespective of variations in its load current.

In a dynamo-electric machine, the flux controlling the value of the induced voltage of the armature is the flux common or mutual to the field and armature windings. This flux is the resultant of the field and armature magneto-motive forces and must be changed or modified under various load conditions to maintain a predetermined operating condition, such as, speed or voltage. The usual method of controlling the resultant flux consists in changing the field flux to maintain a certain desired flux through the armature. This has been accomplished by means of a compound field winding, or by changing the voltage impressed across the field winding which involves the use of a regulator connected to the load circuit in a manner to vary the field excitation in accordance with load current; the regulator being arranged either to control the machine excitation directly or to control the voltage of the field exciter. A less common method consists in maintaining a certain fixed field excitation and changing the reluctance of the flux path or diverting a portion of the field flux in order to control the flux interlinkages of the field and armature.

An alternating-current generator supplying the usual industrial load will require an increase in field excitation, or increased flux linkages of field and armature for any increase in load, in order to restore the voltage to its normal value or some predetermined value. This increased excitation, involving the changing of flux in a many-turned field coil, occurs at an appreciable interval of time after the application of load. Ordinarily this interval of time is not conspicuous in the usual industrial applications of dynamo-electric machines, especially where there is no large distance causing power transmission. This interval of time is of considerable importance in limiting the maximum power limit of the transmission line because variations in line voltage large enough to produce instability in the operation of synchronous apparatus interconnected with the system are likely to occur with changes in load.

In accordance with my invention, the time interval between change in alternator load and useful flux is greatly reduced through the use of regulating means utilizing the principle of controlling the reluctance of the magnetic path in a new manner, which consists in causing normally a high flux density in the armature core, producing thereby a high reluctance, and controlling the flux density in accordance with the variations in load current so as to decrease the reluctance of the armature core and cause the flux linkages of the field and armature to increase substantially simultaneously with an increase of load current.

Figure 2:
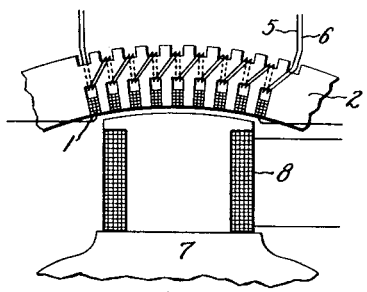

The novel features which I believe to be characteristic of my invention are set forth with particularity in the appended claims. The invention itself, however, both as to organization and method of operation, together with further objects and advantages thereof, will best be understood by reference to the following description taken in connection with the accompanying drawing in which Fig. 1 is a diagrammatic representation of one embodiment of my invention as applied to a single-phase alternating-current generator, and Fig. 2 is a detailed view of a portion of the generator armature core and field structure.

Referring to the drawing, the field excitation of the single-phase, four-pole, synchronous generator there shown is provided by means of an ordinary direct-current exciter so that full-load field excitation is maintained for the full range of operation. The synchronous alternator carries an armature winding 1 embedded in slots in the armature core 2 in the usual manner and connected to the mains 3 and 4. Windings 5 and 6 complete encircle the armature core and may be positioned as shown in Fig. 2. The field structure 7 of the alternator is provided with an exciting winding 8 connected with slip-rings 9, 10, carried on the alternator shaft. These slip-rings are connected by means of brushes to the direct-current exciter 12 having a field winding 13 with an adjustable resistance 14 in series therewith for obtaining the initial adjustment of the exciter voltage. Winding 5 may be energized by any convenient direct-current source but is shown as connected across the exciter mains with an automatically regulated variable resistance 15 interposed in its circuit. While means shown as a regulator 11 comprising an operating coil 16 responsive to line voltage and a core 17 biased to its illustrated position by a spring 18 have been provided for controlling the resistance 15 and consequently the excitation of the winding 5, it will be apparent that a regulator of any suitable type may be utilized for that purpose. The winding 6 is arranged to produce a flux acting in opposition to the flux set up by the winding 5, and is excited by means of a rectifying device 19 connected to the alternator mains through a series transformer comprising a primary winding 20 and a secondary winding 21. It will be observed that the rectifying device 19, shown as a mercury-vapor rectifier, is provided with anodes 22, 23 and a cathode 24. The opposite terminals of the secondary winding 21 are connected to the anodes 22, 23, and the midpoint thereof is connected to one terminal of the winding 6 which has its other terminal connected to the cathode 24. The device 19 is provided with a starting switch 25 and a battery 26.

The mode of operation of the embodiment of my invention as shown is somewhat as follows: Assume the alternator is driven by a suitable prime mover (not shown) and is supplying a given load over the transmission lines 3 and 4. The operation of the mercury-vapor rectifier will be initiated by means of the starting switch 25 and battery 26 or equivalent means. The direct-current exciter 12 is adjusted by means of the adjustable resistance 14 to provide full-load excitation for the field winding 8. The useful flux through the armature and hence the induced voltage, which is produced by the field winding 8, is adjusted to a desired value by controlling the current through the winding 5 which is arranged to produce normally a high flux density or saturation in the armature core. The saturating current through the winding 5 is controlled by means of the regulator 11 which operates through the agency of its operating coil 16 to insert or short-circuit the resistance 15, interposed in the circuit of the winding 5, to maintain a given terminal voltage under all conditions of steady load. Since the alternator mains are carrying a load the secondary winding 21 of the series transformer is energized and an alternating current voltage will be impressed across the anodes 22 and 23 of the device 19. The winding 6 is energized from the direct-current terminals of the rectifier and since it is arranged to oppose the flux set up by the winding 5, it will desaturate or decrease the flux density of the armature core and therefore the reluctance thereof and permit a greater flux linkage of field and armature with increasing load. The regulator 11 tends to maintain a given terminal voltage under all conditions of steady load but with a suddenly increased load the winding 6 will provide for decreasing the reluctance of the armature core to more than offset the increase in reluctance due to the armature reaction of the alternator so that the flux linkages of the field and armature will begin to increase substantially simultaneously with the increase in load instead of decreasing as with the ordinary voltage regulator operating on the field or field exciter.

While I have shown and described a particular embodiment of my invention as applied to a single-phase alternating-current generator, it will be apparent to those skilled in the art that it is applicable to a polyphase alternating-current generator or to any dynamo-electric machine in which a change of flux linking with the armature is desired in order to control an operating condition, such as voltage, power factor, or speed, and I, therefore, aim in the appended claims to cover all such changes and modifications as fall within the true spirit and scope of my invention.

What I claim as new and desire to secure by Letters Patent of the United States, is:

1. The combination of a dynamo-electric machine having field and armature windings and magnetic cores therefor, means for modifying the magnetic reluctance of said armature core independently of the variation thereof due to the flux produced by said field and armature windings, and means for controlling said first mentioned means in accordance with an electrical characteristic of said dynamo-electric machine.

2. The combination of a dynamo-electric machine having field and armature windings and magnetic cores therefor, means for producing a high magnetic flux density in said armature core independently of the flux produced therein by said field and armature windings, and means for varying the flux density of said armature core in inverse proportion to the magnitude of the armature current.

3. The combination of a dynamo-electric machine having field and armature windings and magnetic cores therefor, means for producing magnetic saturation in said armature core independently of the flux produced therein by said field and armature windings, and means for varying the degree of saturation of said armature core in inverse proportion to the magnitude of the armature current.

4. The combination of a dynamo-electric machine having field and armature windings and magnetic cores therefor, an auxiliary winding connected to a source of exciting current and arranged for causing said armature core normally to have a high magnetic reluctance, and a second auxiliary winding connected to be energized in accordance with an electrical condition of said dynamo electric machine for varying the magnetic reluctance of said armature core.

5. The combination of a dynamo-electric machine having field and armature windings and magnetic cores therefor, auxiliary differential windings arranged on said armature core, a source of exciting current connected to one of said auxiliary windings, means responsive to the voltage of said dynamo electric machine for controlling the exciting current of one of said auxiliary windings, and means responsive to the current of said dynamo-electric machine for exciting the other of said auxiliary windings.

6. The combination of an alternating-current dynamo-electric machine having field and armature windings and magnetic cores therefor, an auxiliary winding on said armature core, a source of exciting current connected to said auxiliary winding, a regulator responsive to the voltage of said dynamo-electric machine for controlling the exciting current through said auxiliary winding, a rectifier connected in series relation with the armature winding, a second auxiliary winding on said armature core connected to the direct current terminals of said rectifier and cooperating with said first auxiliary winding to vary the magnetic flux density of said armature core in inverse proportion to the magnitude of the armature current.

7. Means for controlling the useful magnetic flux linkages of a dynamo-electric machine having field and armature windings, comprising differentially wound coils on the armature core of said dynamo-electric machine, means for exciting one of said auxiliary windings in a manner to produce normally a high flux density in said armature core, and means responsive to the load current of said dynamo-electric machine for exciting another of said auxiliary windings, said auxiliary windings cooperating to vary the magnetic reluctance of the magnetic circuit in said armature core in a manner to maintain a predetermined operating condition of said dynamo-electric machine.

8. Means for controlling the voltage of an alternating current dynamo-electric machine supplying a transmission line, comprising differentially wound auxiliary windings on the armature core of said dynamo-electric machine, a source of excitation connected to one of said auxiliary windings for producing normally a high flux density in said armature core, rectifying means interconnecting said transmission line and another of said auxiliary windings for varying the flux density of said armature core in a manner to vary the useful flux linkages substantially simultaneously with a change in load to maintain the voltage of said alternating-current machine at a predetermined value.

9. Means for controlling the voltage of an alternating current dynamo-electric machine supplying a transmission line, comprising differentially wound auxiliary windings on the armature core of said dynamo-electric machine, an exciter connected to one of said auxiliary windings, a regulator responsive to the voltage of said transmission line for controlling the magnetization of said armature core by the auxiliary winding connected to said exciter, rectifying means interconnecting said transmission line and another of said auxiliary windings for varying the magnetic reluctance of said armature core substantially simultaneously with load changes in a manner to maintain the voltage of said dynamo-electric machine at its normal value.

In witness whereof, I have hereunto set my hand this 9th day of November, 1925.

CLIFFORD A. NICKLE.